(No Model.) 2 Sheets—Sheet 1.
D. LUBIN.
CLOD CRUSHER, PULVERIZER, AND SEEDER.
No. 354,513. Patented Dec. 14, 1886.
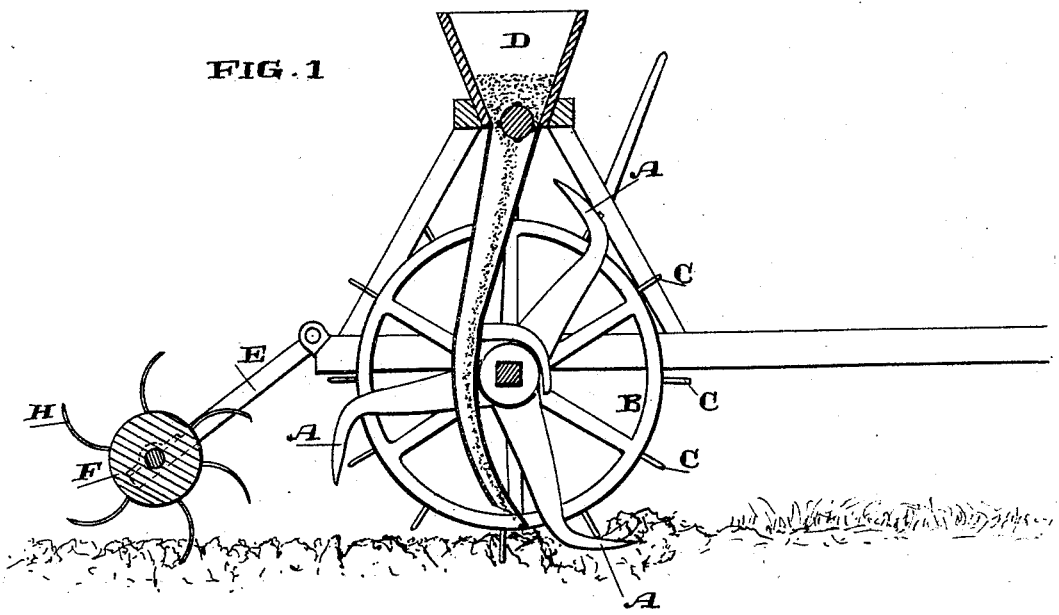
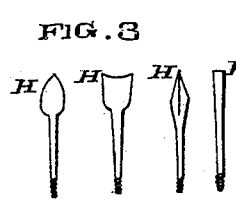
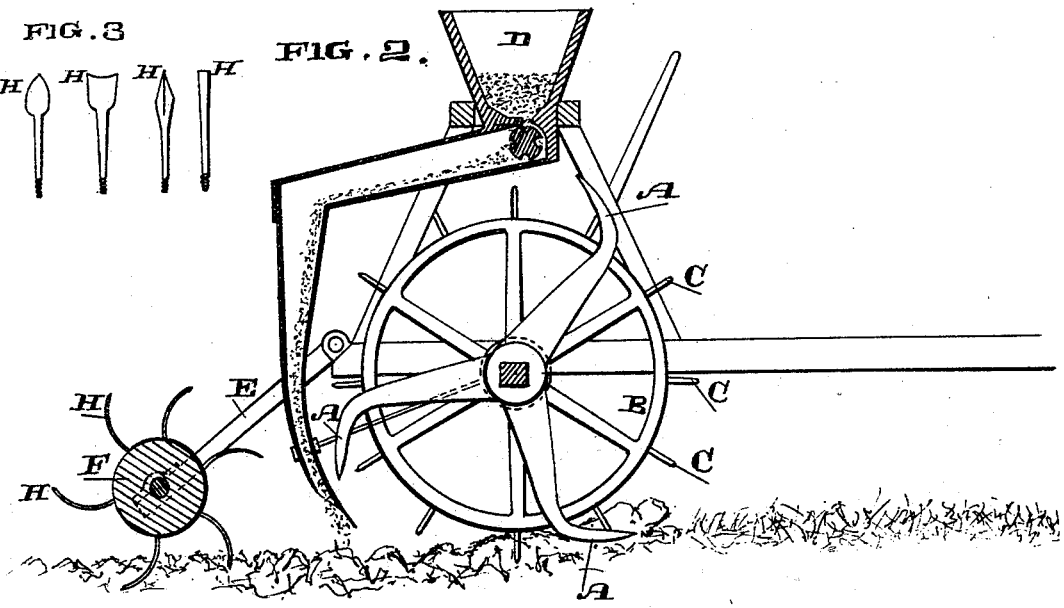
Witnesses,
Geo. H. Strong.
J. H. Nurse.
Inventor,
David Lubin
By Dewey & Co.
atty.

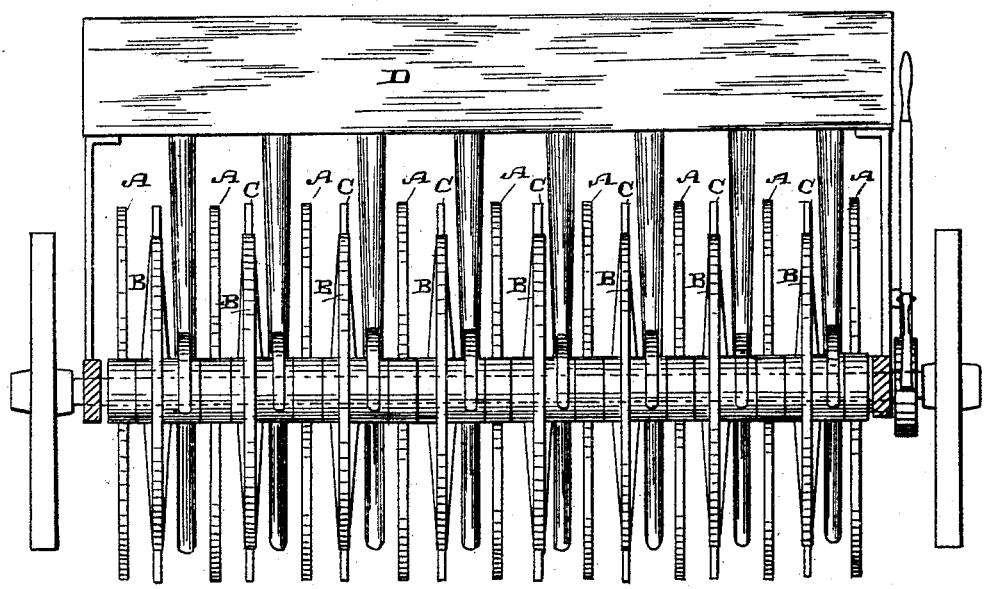

UNITED STATES PATENT OFFICE.

DAVID LUBIN, OF SACRAMENTO, CALIFORNIA.

CLOD-CRUSHER, PULVERIZER, AND SEEDER.

SPECIFICATION forming part of Letters Patent No. 354,513, dated December 14, 1886.

Application filed October 21, 1886. Serial No. 216,892. (No model.)

*To all whom it may concern:*

Be it known that I, DAVID LUBIN, of Sacramento, Sacramento county, State of California, have invented an Improvement in a Clod-Crusher, Pulverizer, and Seeder; and I hereby declare the following to be a full, clear, and exact description of the same.

My invention relates to an apparatus for crushing and pulverizing clods or lumps of earth and simultaneously seeding the ground and covering the seed, the whole being completed at a single operation.

It consists of a roller or series of disks mounted upon a shaft so as to rotate independently, or, when desired, keyed fast to the axle, provided with radial arms or fingers, a series of lifting-fingers projecting forward between the toothed disks, so as to raise the lumps or clods and bring them into position to be broken between the teeth and the fingers as the disks rotate, and in connection therewith of a seeder of any suitable or desired construction, which shall seed the ground, and a device by which the seed thus deposited may be covered.

Referring to the accompanying drawings for a more complete explanation of my invention, Figure 1 is a side elevation showing one construction. Fig. 2 is a side elevation showing a different arrangement of the discharge-spouts. Fig. 3 is a view of different forms of covering spades or teeth. Fig. 4 is a rear view.

In a former application filed by me in the Patent Office September 30, 1886, and numbered 214,968, I have shown a series of disks having radial fingers and mounted upon a shaft or axis, about which they may turn, the whole device being supported by bearing-wheels at either side, if desired. Between these disks lifting-fingers project forward at such an angle as to lift up the clods or large pieces of earth, carrying them backward to such a point that the spikes or teeth of the rotating disks will strike and crush them, depositing the pulverized earth upon the ground behind the apparatus.

In the present case I have shown and decribed a clod crushing and pulverizing machine, in which A are the lifting-fingers; B, the roller or disks having the radially-projecting spikes or teeth C, which act to crush or break the clods.

D is a seeder or box, from which the seed may be distributed, either broadcast to the width that is operated on by the machine, or it may be deposited in drills, or at intervals, as may be desired.

I do not wish to confine myself to any particular form of seeder, but would employ any one of those which are well known, according to the seed which I wish to sow or plant. The mechanism for depositing the seed may also be operated directly from the shaft of the bearing-wheels of the machine through the agency of gears or belt-pulleys in the ordinary or any well-known manner adapted for operating seeders.

Behind the machine, and connected to the frame by means of arms E, is a small roller, F, or separately-rotating disks on a shaft journaled in the arms E, so as to rotate as it travels behind the other portion of the machine. This roller is provided with shovels, spoons, teeth, or other projecting and covering implements or devices, H, which are preferably set spirally around the roller or disks, so as to enter in rotation all points of the ground which have been worked by the roller or disks previously described. These arms or teeth will agitate the loose earth in such a way as to cover the grain which has been previously sown, and the work will be effectually completed.

Having thus described my invention, what I claim as new, and desire to secure by Letters Patent, is—

A combined clod-crusher, pulverizer, and seeder, composed of the rotating armed or toothed roller or disks, with the alternating lifting-fingers projecting forward from between them so as to raise the earth and clods to be crushed, in combination with a seeding apparatus adapted to distribute seed upon the ground, and a supplemental roller or disks with its shovels or teeth arranged to cover the distributed seed, substantially as herein described.

In witness whereof I have hereunto set my hand.

DAVID LUBIN.

Witnesses:
S. H. NOURSE,
H. C. LEE.